Sept. 12, 1967   C. J. NOVAK   3,340,782
COMPACTOR
Filed June 14, 1965   6 Sheets-Sheet 2

Charles J. Novak
INVENTOR.

Sept. 12, 1967  C. J. NOVAK  3,340,782
COMPACTOR
Filed June 14, 1965  6 Sheets-Sheet 3

Charles J. Novak
INVENTOR.

Sept. 12, 1967 C. J. NOVAK 3,340,782
COMPACTOR
Filed June 14, 1965 6 Sheets-Sheet 4

Charles J. Novak
INVENTOR.

BY Clarence A. O'Brien
and Harvey B. Jacobson
Attorneys

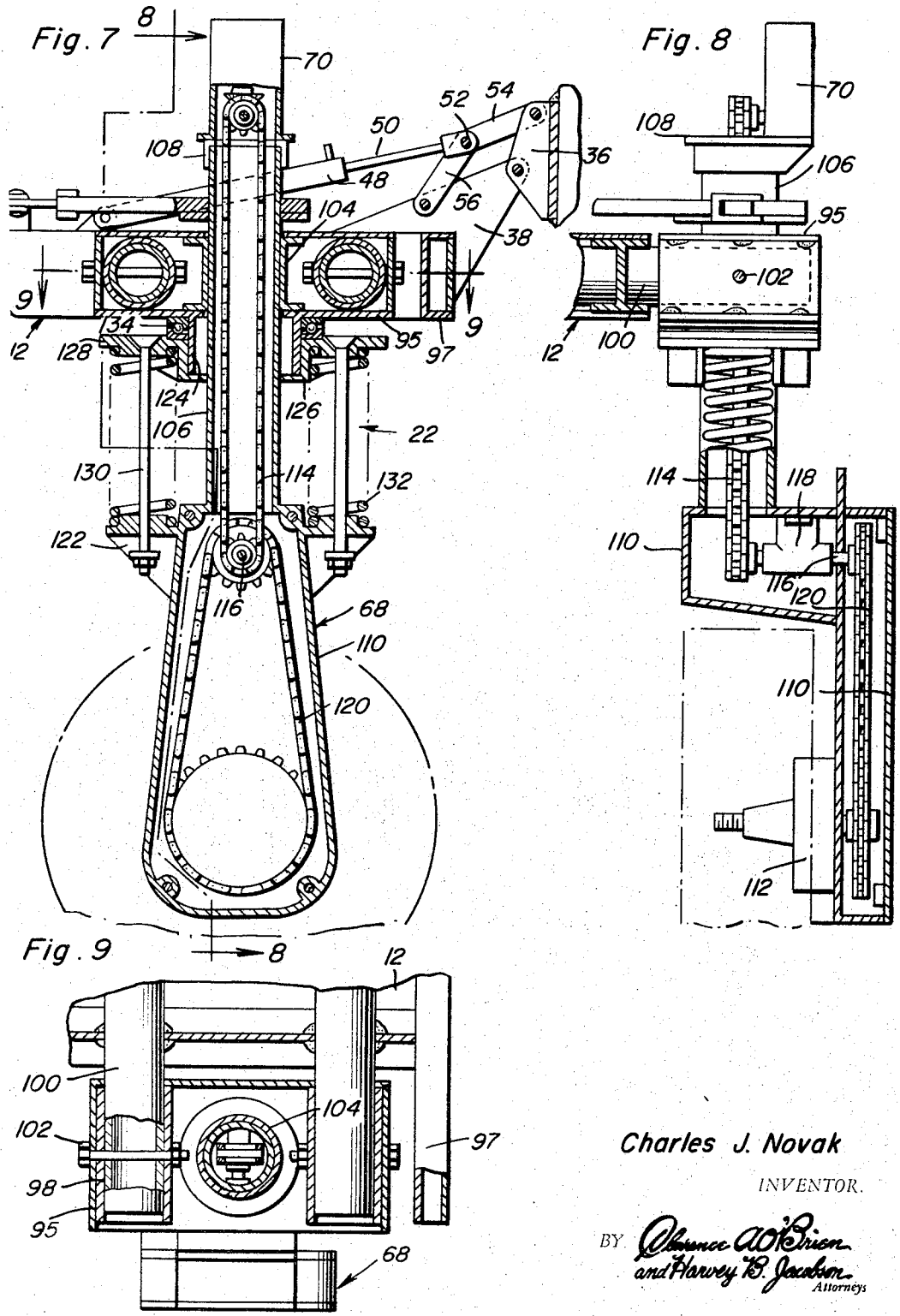

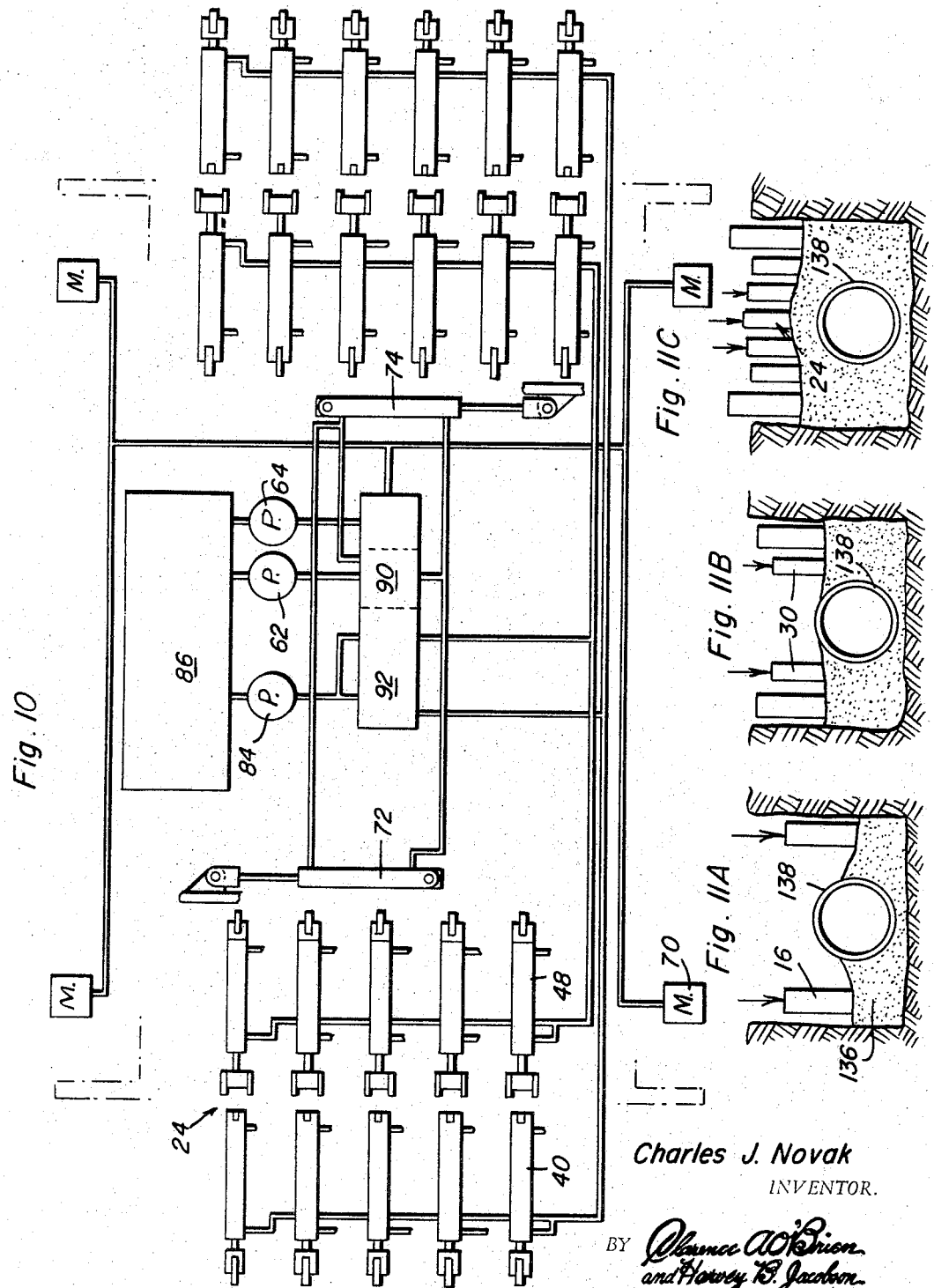

United States Patent Office 3,340,782
Patented Sept. 12, 1967

3,340,782
COMPACTOR
Charles J. Novak, Lubbock, Tex.
(P.O. Box 1586, Tehran, Iran)
Filed June 14, 1965, Ser. No. 463,509
10 Claims. (Cl. 94—50)

ABSTRACT OF THE DISCLOSURE

A soil compacting vehicle wherein the load of the frame supported by the powered wheels may be transferred to compaction rollers selectively displaceable into engagement with soil surrounding a pipe placed in a trench. The powered wheels straddle the pipe within the trench for compaction of soil as the vehicle is propelled along the trench, while the compaction rollers are progressively engaged with the soil for compaction thereof above the pipe.

---

This invention relates to a machine for compacting earth or soil and more particularly to a machine for compacting the backfill material about piper laid in excavated ditches or trenches.

The apparatus of the present invention is particularly useful in connection with the laying of underground pipes in that it is capable of more rapidly and effectively compacting backfill about a pipe line to the required density It is therefore a primary object of the present invention to provide a self-propelled machine for compacting the backfill soil within an excavated trench or ditch about a pipe line.

Another object of the present invention is to provide a compacting machine which is operative by rolling action or backfill material to compact earth about a pipe line disposed within an excavated ditch or trench.

A further object of the present invention is to provide a compacting machine having traction wheels and compacting wheels positionable entirely within an excavated ditch within which a pipe line is laid so that backfill may be progressively compacted about the pipe line a most rapid and effective manner.

An additional object of the present invention is to provide a compacting machine having a loaded platform supported by traction wheels above ground level, the traction wheels being adjustably spaced so as to ride within the excavated ditch in order to compact backfill on either side of a pipe line disposed within the ditch.

Yet another object of the present invention in accordance with the foregoing object, is to provide a compacting machine having a plurality of selectively positioned compaction wheel devices adapted to roll over backfill disposed between the traction wheels that straddle the pipe line in order to compact a wide area as the machine is propelled through the excavated ditch.

A still further object of the present invention is to provide a compacting machine of the self-propelled type having adjustably spaced traction wheels through which the machine is propelled and a plurality of compacting devices selectively displaced to operative positions between the traction wheels in order to compact the backfill between the traction wheels. Each of the compacting devices is accordingly provided with pneumatic tire wheels or rollers mounted at the ends of reciprocable members which are pivotally mounted by sleeve assemblies to the vehicle platform supported in vertically spaced relation above the traction wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 7 is an enlarged partial sectional view taken substantially through a plane indicated by section line 7—7 in FIGURE 1;

FIGURE 8 is a partial sectional view taken substantially through a plane indicated by section line 8—8 in FIGURE 7;

FIGURE 9 is a partial sectional view taken substantially through a plane indicated by section line 9—9 in FIGURE 7;

Figure 1:
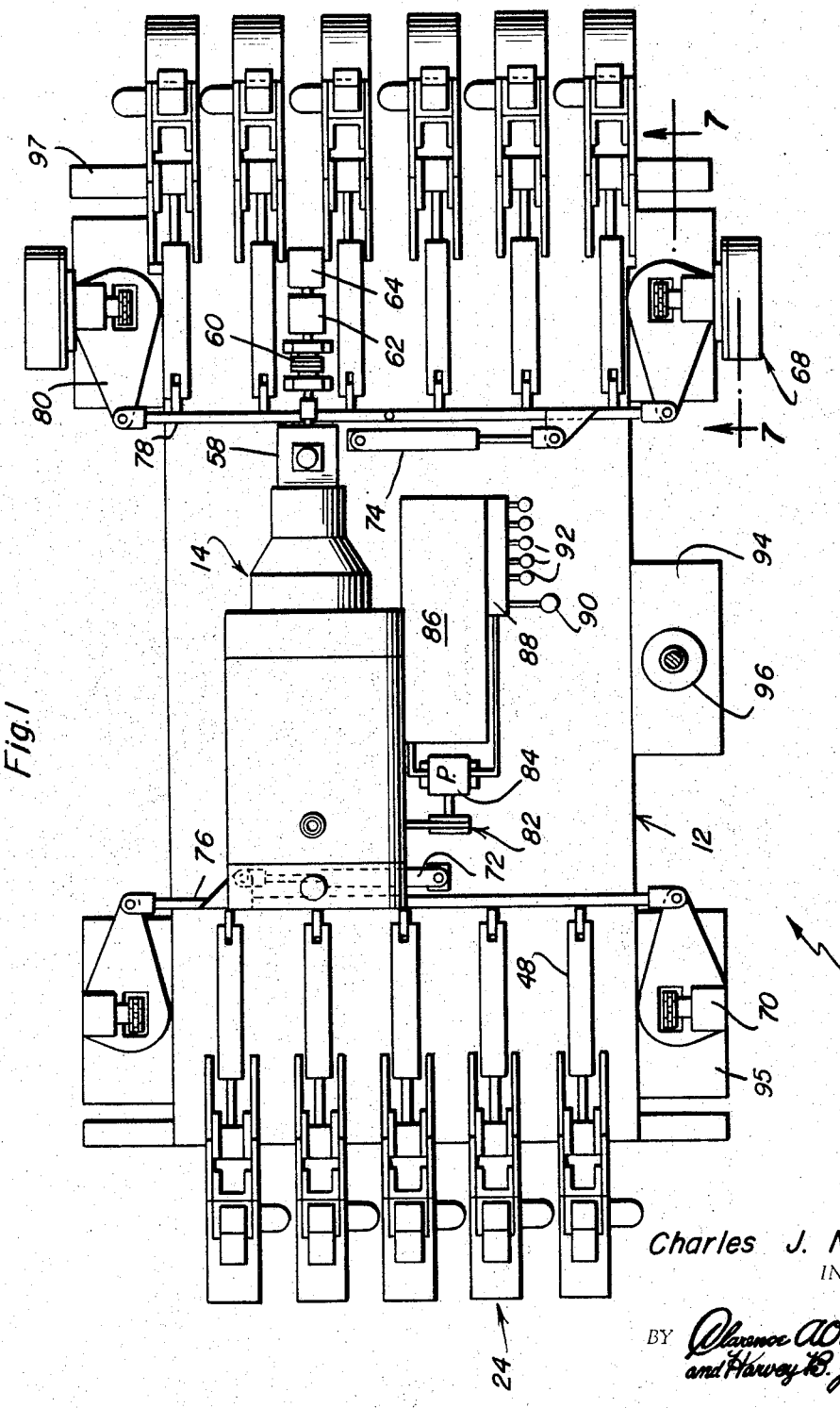
FIGURE 1 is a top plan view of the compacting machine of the present invention.
Figure 2:
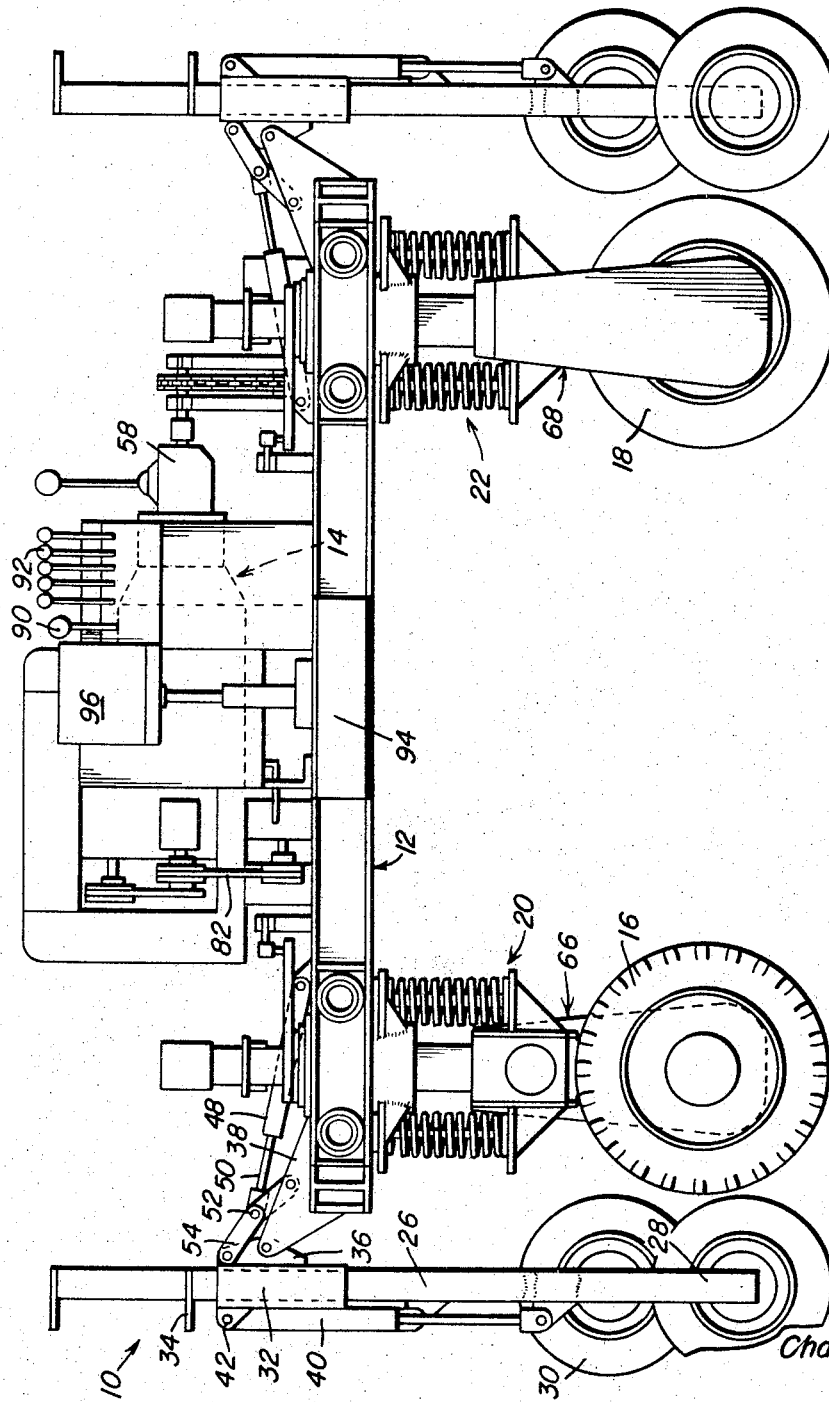
FIGURE 2 is a side elevational view of the machine shown in FIGURE 1.
Figure 3:
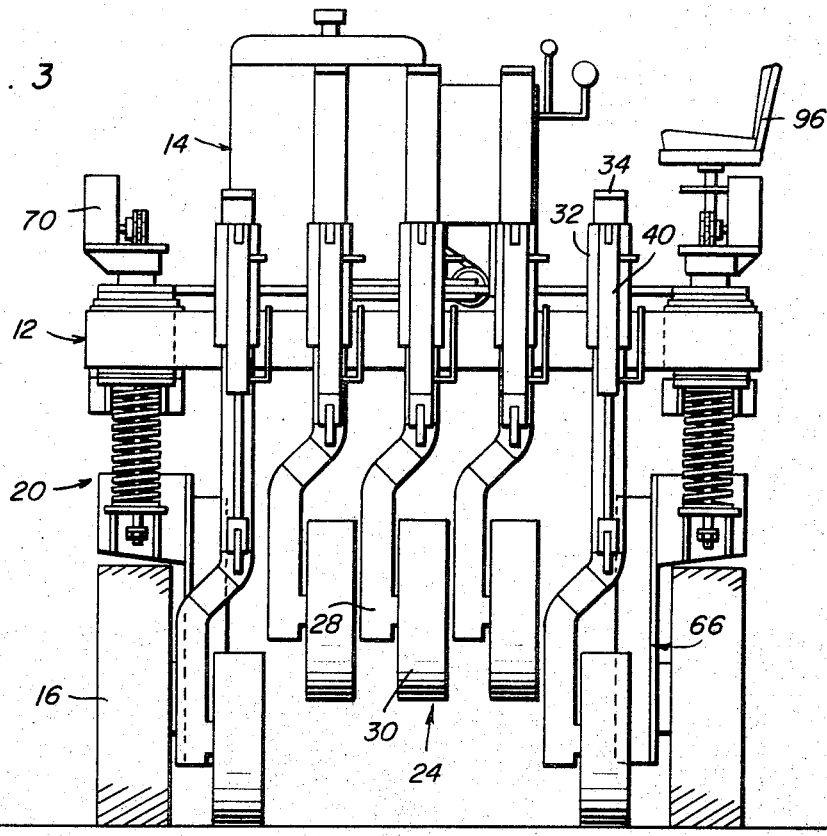
FIGURE 3 is a front elevational view of the compacting machine.

FIGURE 10 is a simplified hydraulic circuit diagram corresponding to the control system associated with the present invention; and FIGURES 11a, 11b and 11c are diagrammatic illustrations showing the manner in which the compacting machine of the present invention is utilized Referring now to the drawings in detail, it will be noted from FIGURES 1 and 2, that the compacting machine generally denoted by reference numeral 10 includes a mounting frame in the form of a platform 12 suitably constructed of structural members and loaded by power operated facilities including a power plant in the form of an internal combustion engine 14. The platform 12 is supported in vertically spaced relation above the ground by a pair of forward traction wheels 16 and a pair of rear traction wheels 18. Wheel mounting suspension assemblies 20 and 22 respectively support opposite ends of the platform above the traction wheels 16 and 18. Also mounted by the platform adjacent the opposite ends thereof, are a plurality of compacting devices 24, five such compacting devices being disposed at the forward end and six at the rear end in laterally staggered relation to the forward end devices as in FIGURE 1.

Referring now to FIGURES 3–6 in particular, it will be observed that each of the compacting devices 24 includes an elongated member 26 one end of which is provided with an offset portion 28 so as to rotatably mount a roller 30 in the form of a pneumatic tire, the roller being substantially aligned with the major portion of the elongated member 26 to which the offset portion 28 is connected. The elongated member is reciprocably mounted within a support sleeve member 32 and is provided at its end opposite the offset portion 28 with a stop plate 34 so as to prevent disassembly of the elongated member from the sleeve 32. Each of the compacting devices is pivotally mounted by means of its sleeve at either the forward or rear end of the platform 12 and toward this end, the sleeve is provided with a projecting plate portion 36 pivotally connected to bracket plate members 38 secured as by welding to the platform.

Associated with each of the compacting devices 24, is a fluid power operated cylinder device 40 pivotally secured at one end to the sleeve 32 by the pivot connection 42. A piston rod 44 extends from the cylinder device 40 and is pivotally connected by the pivotal connection 46 to the elongated member 26 in order to impart reciprocatory movement to the member 26. Thus, when a compacting device is displaced to an operative position, the bearing pressure exerted by the roller 30 may be increased by extension of the piston rod to transfer the load of the platform to the roller.

Figure 5:
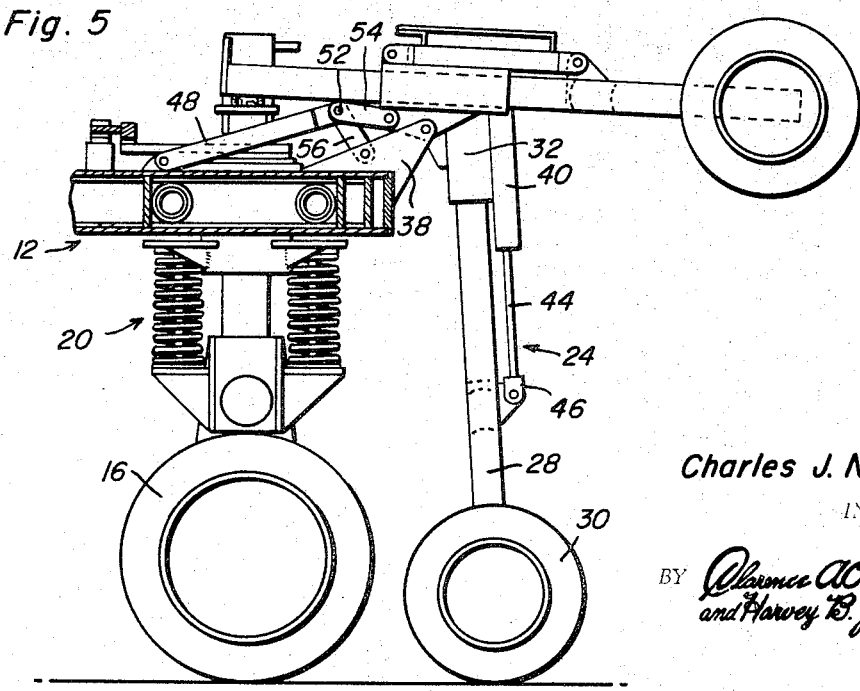
FIGURE 5 is a partial side elevational view of the machine with some of the compacting devices disposed in inoperative positions.
Figure 4:
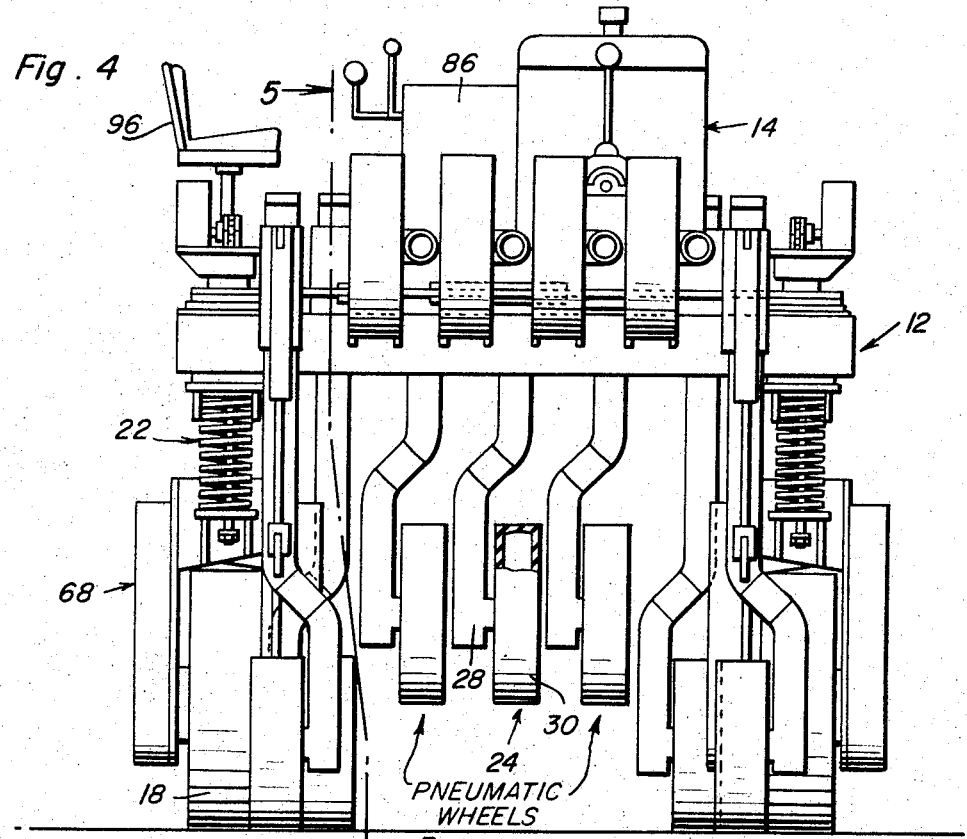
FIGURE 4 is a rear elevational view of the machine.
Figure 6:
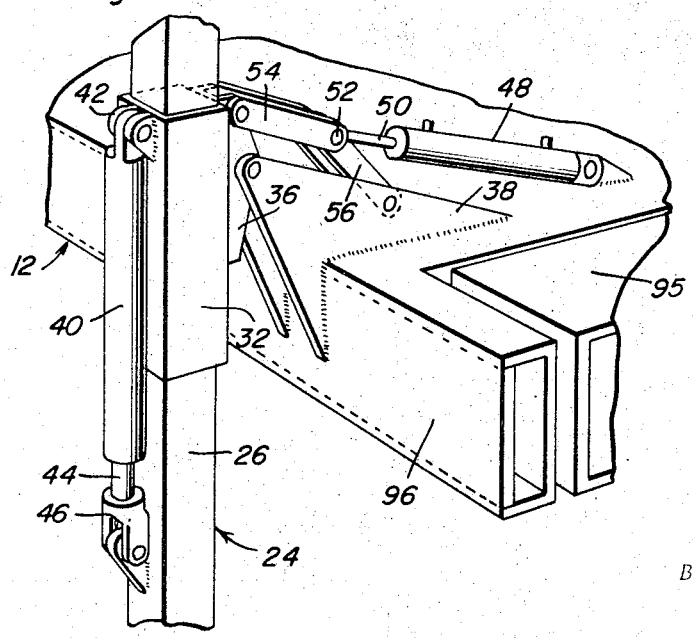
FIGURE 6 is a partial perspective view showing a portion of the compacting machine.

Each of the compacting devices may therefore be controllably positioned between a substantially horizontal position and a substantially vertical position as shown in FIGURE 5 by positioning means more clearly shown in FIGURE 6. The positioning means includes a positioning cylinder device 48 pivotally mounted at one end on the platform and having a piston rod 50 extending therefrom and is pivotally connected to a toggle joint 52 between the toggle links 54 and 56 respectively connected to the projection plate 36 on the sleeve 32 and to the pivot bracket 38 on the platform 12. Accordingly, fluid under pressure supplied to opposite ends of the positioning cylinder device 48 will be effective to pivotally displace the compacting device between the inoperative and operative positions as shown in FIGURE 5.

Referring once again to FIGURES 1, 3 and 4, it will be observed that the compacting devices 24 are disposed in close lateral spaced relationship to each other at the forward and rear ends of the platform so that when the compacting devices are lowered from the horizontal positions to the vertical positions, they will be disposed between the two pairs of traction wheels 16 and 18 and thereby effective to compact soil between the traction wheels as the compacting machine is propelled along a path by the traction wheels. Power for propelling the machine is derived from the power plant 14 which is drivingly connected through a transmission 58 and a chain sprocket gear 60 to the pump mechanisms 62 and 64. The forward and rear wheels 16 and 18 are rotatably mounted by wheel mounting assemblies 66 and 68 respectively, each wheel mounting assembly having mounted on top thereof a fluid drive motor 70. Power for operating each of the fluid drive motors is derived from the output of the pump mechanism 64. The output of the pump mechanism 62 on the other hand, is supplied to a pair of steering cylinder devices 72 and 74 pivotally connected to the platform. The piston rods which extend from the steering cylinder devices are pivotally connected to a pair of steering bars 76 and 78 which interconnect steering arms 80 secured to the upper ends of the wheel mounting assemblies 66 and 68 for angular displacement thereof about vertical axes. The power plant 14 is also provided with a power take-off drive 82 by means of which a third pump mechanism 84 is driven. Fluid power for operating the positioning cylinder devices 48 and the reciprocating cylinder devices 40 associated with each of the compacting devices may therefore be derived from the pump mechanism 84. A fluid reservoir 86 is therefore mounted adjacent the power plant intermediate the ends of the platform from which the pump mechanisms may draw fluid for operating the various drive motors and cylinder devices aforementioned. The fluid discharge from the pump mechanisms may therefore be routed under control of an operator by means of the control panel 88. Accordingly, the control panel may mount a steering control valve with which the steering control 90 is associated in order to directionally guide movement of the compacting machine. A plurality of valve controls 92 may also be provided so that the operator may selectively control the displacement of the compacting devices between the inoperative and operative positions as well as to control the bearing pressures. An operator's station 94 may therefore be secured to the platform in proper operative relation to the control panel 88 and provided with a seat 96 from which an operator may conveniently exercise control over the machine through the control panel as well as visually supervise the compacting operations being performed.

Referring now to FIGURES 7, 8 and 9 in particular, it will be observed that each of the wheel mounting assemblies 66 and 68 are rotatably mounted by means of the load transfer members 95 adjustably secured to the platform 12 adjacent to the lateral extensions 97 at each corner of the platform through which the load of the platform is transferred to the wheels 16 and 18 adjacent opposite ends of and laterally of the platform. Each load transfer member is therefore provided with a pair of horizontally spaced sleeve elements 98 through which a pair of tubular members 100 project, said tubular members being secured as by welding to the platform and extending laterally therefrom adjacent to the extensions 97. Accordingly, a plurality of holes may be formed in the tubular members 100 through which the fastener bolt assemblies 102 are received for securing the load transfer members 95 in adjusted position to the platform. It will therefore be apparent that the lateral spacing between the traction wheels may be changed in accordance with different dimensional requirements. The load transfer members are therefore provided with sleeve bearings 104 through which the vertical axes for the wheel mounting assemblies are established. Each wheel mounting assembly therefore includes an upper tubular portion 106 which is circular in cross section and extends through the sleeve bearing 104. A mounting member 108 is secured to each of the tubular portions 106 above the platform for supporting the fluid drive motor 70 thereon. A gear housing portion 110 is secured to the lower end of the tubular portion 106 disposed on one side of the traction wheel. Accordingly, a bearing assembly 112 is secured to the gear housing portion 110 on which the traction wheel is rotatably mounted. The drive motor 70 mounted on top of the wheel mounting assembly is therefore drivingly connected by the sprocket chain 114 to an intermediate sprocket shaft 116 rotatably mounted by the hanger journal 118 at the lower end of the tubular member 106. The intermediate sprocket shaft 116 is in turn drivingly connected to the traction wheel by the sprocket chain 120 so as to complete a drive connection from the drive motor 70 to the traction wheel.

The platform is yieldably supported in vertically spaced relation above the traction wheels by the spring suspension assemblies 20 and 22. Each suspension assembly includes a pair of spring seating brackets 122 secured to the gear housing portion 110 associated with each wheel mounting assembly. Each of the load transfer members has secured thereto a downwardly extending sleeve section 124 about which a tubular member 126 is rotatably mounted. A pair of flanges 128 are secured to the tubular member 126 by means of which the tubular member is connected by the elongated bolt members 130 to the spring seating brackets 122. The bolt members 130 are slidably received through the spring seating brackets so that the tubular member 126 will be rotatable with the wheel mounting assembly about its vertical steering axis. The suspension springs 132 encircle the elongated bolt members 130 and are seated on the brackets 122 in order to yieldably support the load imposed on the tubular member 126. The tubular member 126 is loaded through the bearing assembly 134 by the platform to which the load transfer member 95 is adjustably secured as aforementioned.

From the foregoing description, the construction, operation and utility of a compacting machine of the present invention will be apparent. The operator of the machine will therefore be able to control the direction in which the machine is propelled by simultaneous energization of the drive motors 70 in opposite directions through a reversing valve assembly 89 as diagrammatically shown in FIGURE 10. When the power plant is operative to propel the vehicle, fluid under pressure from the pump mechanism 62 driven by the power plant may be controllably routed through a valve assembly controlled by the steering control 90 to operate the steering cylinder devices 72 and 74. The wheel mounting assemblies may thereby be angularly displaced about their vertical axes. Also, the vertical axes of the wheel mounting assemblies for the traction wheels may be adjusted in accordance with different dimensional requirements as aforementioned. In this fashion, the spacing between the traction wheels may be adjusted so that the vehicle may ride within an excavated ditch 136 as diagrammatically illustrated in FIGURE 11a. Accordingly, the traction wheels will straddle the pipe line 138 disposed within the ditch and may thereby compact backfill material 140 on either side of the pipe line. The platform supported by the traction wheels will therefore be vertically spaced above the traction wheels a sufficient distance to be above the ground level 142 and will load the traction wheels so that it will effectively compact the backfill as the machine is being propelled. After the level of the backfill is increased, as shown in FIGURE 11b, compacting devices 24 may be selectively lowered into operative positions engaging the backfill material in order to increase the area being compacted on either side of the pipe line 138. Compaction of the backfill by the compacting devices is effected by both lowering and redistributing the load of the platforms amongst the compacting rollers under control of the power operated cylinder devices 40. Thus, the level of the backfill material may be increased and the compacting machine propelled thereover with additional compacting devices lowered into operative positions in order to progressively widen the area being compacted as the backfill covers the pipe line. When the pipe line is completely covered with backfill, the center compacting devices at the forward and rear ends of the compacting machine may be lowered into operative position as shown in FIGURE 11c. It will therefore be appreciated that the objectives of the present invention are fulfilled because of the movement of the compacting machine within the excavated ditch itself compacting the backfill adjacent the sides of the ditch by the rolling action of the loaded traction wheels themselves. Selective lowering of the compacting devices will also progressively enlarge the area being compacted by redistributing the load carried by the traction wheels as the compacting machine is propelled in opposite directions through the ditch. The compacting operation may thereby be performed rather rapidly relying upon a rolling action with the compaction area being progressively increased until the requisite backfill density is obtained throughout.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for compacting backfill below ground level about a pipe within an excavated ditch comprising, a platform, at least two pairs of traction wheels, wheel mounting means supporting the platform on the traction wheels above ground level, said traction wheels adapted to straddle the pipe within the ditch, a plurality of compacting devices, support means movably mounting each of said compacting devices on the platform adjacent to each pair of said traction wheels, positioning means mounted on the platform and operatively connected to said support means for displacing the compacting devices to operative positions between each pair of said traction wheels, power operated means mounted on the support means and connected to said compacting devices for lowering the compacting devices to transfer load from the traction wheels to the compacting devices, propelling means mounted on the platform and drivingly connected to said traction wheels for movement of the platform thereby compacting backfill laterally spaced from either side of the pipe by rolling, and selective control means operatively connected to the positioning means and the power operated means for bringing the compacting devices into lowered operative positions progressively compacting said backfill between said pairs of traction wheels during movement of the platform by the propelling means.

2. The combination of claim 1 wherein said wheel mounting means includes a vertically elongated wheel mounting assembly for each traction wheel, a load transferring member rotatably mounting said wheel mounting assembly about a vertical axis, means rigidly mounting said load transferring member on the platform in a laterally adjusted position, and spring means mounted on the wheel mounting assembly for yieldably supporting the load transferring member in vertically spaced relation above the traction wheel.

3. The combination of claim 2 wherein each of said compacting devices comprises, an elongated reciprocal member having a laterally offset portion at one end and a compaction roller rotatably mounted by said offset portion, said support means for each of the compacting devices including a sleeve slidably mounting said reciprocable member, and means pivotally mounting said sleeve on the platform.

4. The combination of claim 3 wherein said positioning means includes, toggle linkage means interconnecting the sleeve for each of the compacting devices to the platform and fluid operated piston means connected to the toggle linkage means for pivotally displacing the compacting device between a substantially horizontal position and said operative position.

5. The combination of claim 4 wherein said propelling means comprises, a fluid motor mounted on each of the wheel mounting assemblies, gear means enclosed within the wheel mounting assembly for drivingly connecting the fluid motor to the traction wheel and steering means connected to the wheel mounting assembly for angularly positioning thereof about the vertical axis.

6. The combination of claim 1 wherein each of said compacting devices comprises, an elongated reciprocable member having a laterally offset portion at one end and a compaction roller rotatably mounted by said offset portion, said support means for each of the compacting devices including a sleeve slidably mounting said reciprocable member, and means pivotally mounting said sleeve on the platform.

7. The combination of claim 6 wherein said propelling means comprises, a fluid motor mounted on each of the wheel mounting assemblies, gear means enclosed within the wheel mounting assembly for drivingly connecting the fluid motor to the traction wheel and steering means connected to the wheel mounting assembly for angularly positioning thereof about the vertical axis.

8. The combination of claim 1 wherein said positioning means includes, toggle linkage means interconnecting each of the support means for the compacting devices to the platform and fluid operated piston means connected to the toggle linkage means for pivotally displacing each of the compacting devices between a substantially horizontal position and said operative position.

9. A compacting machine comprising, a loaded frame, propelling wheel means operatively connected to the frame for support thereof in vertically spaced relation above at least two horizontal axes disposed adjacent opposite ends of the frame, a plurality of compaction devices, support means pivotally mounted on the frame about positioning axes vertically spaced above said horizontal axes for movably mounting said compaction devices, means connected to the support means for selectively displacing said compaction devices between inoperative and operative positions, each of said compaction devices including a roller, said rollers being rotatably mounted in laterally spaced relation to each other adjacent said opposite ends of the frame, and power operated means connected to the compaction devices for lowering the rollers into engagement with the soil when the compaction devices are in said operative positions to transfer the load of the frame to the rollers for progressive compaction of the soil.

10. A compacting apparatus comprising a platform, means resiliently supporting the platform adjacent corners thereof including power driven wheels, a plurality of pivoted supports mounted at opposite ends of the platform, an auxiliary wheel support slidably mounted in each of said pivoted supports, means to pivot said wheel supports, and means to selectively lower said auxiliary wheels relative to the wheel supports associated therewith to transfer a portion of the weight of said platforms to said auxiliary wheels.

References Cited

UNITED STATES PATENTS

| | | | |
|---|---|---|---|
| 1,631,271 | 6/1927 | Keeler | 61—63 |
| 2,120,745 | 6/1938 | Greiner et al. | 61—63 |
| 2,682,153 | 6/1954 | Fink | 61—63 |
| 2,721,405 | 10/1955 | Gardner | 94—50 |
| 2,723,608 | 11/1955 | Jackson | 94—48 |
| 2,753,772 | 7/1956 | Harrison | 94—50 |
| 2,830,511 | 4/1958 | Wills et al. | 94—50 |

JACOB L. NACKENOFF, *Primary Examiner.*